US011169663B2

(12) United States Patent
Ragan, Jr. et al.

(10) Patent No.: US 11,169,663 B2
(45) Date of Patent: *Nov. 9, 2021

(54) RANDOM ACCESS TO PROPERTIES FOR LISTS IN USER INTERFACES (71) Applicant: International Business Machines Corporation, Armonk, NY (US)

(72) Inventors: Richard W. Ragan, Jr., Round Rock, TX (US); Yu Wei Sun, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,147

(22) Filed: May 8, 2019

(65) Prior Publication Data
US 2019/0265848 A1 Aug. 29, 2019

Related U.S. Application Data (63) Continuation of application No. 15/206,535, filed on Jul. 11, 2016, now Pat. No. 10,353,548.

(51) Int. Cl.
*G06F 3/0482* (2013.01)
*G06F 3/0481* (2013.01)
(Continued)

(52) U.S. Cl.
CPC .......... *G06F 3/0482* (2013.01); *G06F 3/0485* (2013.01); *G06F 3/0486* (2013.01);
(Continued)

(58) Field of Classification Search
CPC .. G06F 3/04817; G06F 3/0482; G06F 3/0485; G06F 3/0486; G06F 40/186;
(Continued)

(56) References Cited

U.S. PATENT DOCUMENTS 5,740,389 A   4/1998  Li
8,607,148 B2  12/2013 Singh
(Continued)

FOREIGN PATENT DOCUMENTS

JP         5200641 B2    6/2013
WO      2007036762 A1    4/2007

OTHER PUBLICATIONS

Collomb et al.; "Extending drag-and-drop to new interactive environments: A multi-display, multi-instrument and multi-user approach"; Interacting with Computers, vol. 20, 2008, pp. 562-573.
(Continued)

*Primary Examiner* — David S Posigian
(74) *Attorney, Agent, or Firm* — Peter K. Suchecki (57) ABSTRACT Random access to any arbitrary object stored in a database from a displayed virtual object image corresponding to an object wherein some properties of the object are displayed in the virtual object image is provided through manipulation of a drag icon to cause, in sequence, display of a ghost template listing types of properties for which data is stored in a database, select a property type from the ghost template, display all instances of the selected property type and display another virtual object image containing a selected instance of the property type and including other properties of a corresponding object. All properties of the object to which the resulting virtual object image corresponds can be determined from further manipulation of the drag icon to display another ghost template.

9 Claims, 8 Drawing Sheets (51) Int. Cl.
*G06F 3/0486* (2013.01)
*G06F 40/174* (2020.01)
*G06F 40/186* (2020.01)
*G06F 3/0485* (2013.01)

(52) U.S. Cl.
CPC ........ *G06F 3/04817* (2013.01); *G06F 40/174* (2020.01); *G06F 40/186* (2020.01)

(58) Field of Classification Search
CPC ...... G06F 40/174; G06F 16/14–16/156; G06F 16/168; G06F 16/248; G06F 16/26; G06F 16/9038; G06F 16/904; G06F 16/9538; G06F 16/954
USPC ....... 715/224, 225, 226, 769, 808, 810, 825, 715/828, 829, 831, 835, 841, 843, 845
See application file for complete search history.

(56) References Cited

U.S. PATENT DOCUMENTS

| | | |
|---|---|---|
| 2003/0076359 A1 | 4/2003 | Martinez |
| 2003/0084402 A1 | 5/2003 | Treibach-Heck |
| 2004/0205526 A1 | 10/2004 | Borodovski |
| 2005/0131945 A1 | 6/2005 | Muller |
| 2006/0036568 A1* | 2/2006 | Moore ................ G06F 16/168 |
| 2007/0136286 A1 | 6/2007 | Webster |
| 2007/0150834 A1 | 6/2007 | Muller |
| 2008/0222540 A1 | 9/2008 | Schulz |
| 2009/0044095 A1 | 2/2009 | Berger |
| 2009/0259959 A1 | 10/2009 | Grotjohn |
| 2009/0288044 A1 | 11/2009 | Matthews |
| 2010/0122194 A1 | 5/2010 | Rogers |
| 2011/0072373 A1* | 3/2011 | Yuki .................... H04N 5/4403 715/764 |
| 2011/0219312 A1 | 9/2011 | Kim |
| 2011/0258540 A1 | 10/2011 | Ueda |
| 2014/0223369 A1 | 8/2014 | Wielgosz |
| 2014/0258828 A1 | 9/2014 | Lymer |
| 2015/0297995 A1 | 10/2015 | Haussila |
| 2016/0224217 A1 | 8/2016 | Kim |
| 2017/0357627 A1* | 12/2017 | Peterson ................ G06F 7/023 |
| 2018/0011610 A1 | 1/2018 | Ragan, Jr. |

OTHER PUBLICATIONS

Karger et al.; "Haystack: A Customizable General-Purpose Information Management Tool for End Users of Semistructured Data"; Proceedings of the 2003 CIDR Conference, pp. 1-15.

List of IBM Patents or Patent Applications Treated as Related, May 8, 2019, 2 pages.

* cited by examiner

Table of Dogs

| Type: | Weight | Common Color | Temperament | Energy level |
|---|---|---|---|---|
| Golden Retriever | 70lb | gold | lovable | medium |
| Cocker Spaniel | 40lb | black, brown | affectionate | low |
| Maltese | 10lb | white | intelligent | medium |
| Chihuahua | 7lb | white/black | affectionate | medium |
| Whippet | 20lb | gray | athletic | high |
| Poodle | 5-70lb | white/black | intelligent | high |
| etc | | | | |

Single object: Email contact (single record)

Figure 4

```
Name              Picture of Contact
Birthday          Lists
Address           Date modified
office phone      Favorite
cell phone
```

Figure 5A

```
Name              Picture of Contact
Birthday          Lists
Address           Date modified
office phone      Favorite
cell phone
```

Figure 5B

Names:
Adam Reese
Billy Childs
Cindy Hass
Edward Scissors
Henry Wink
Jenny Williams
John Smith
Kelly Brock
Li Long
Mary Sue Alt
Peter Wild
Roger Lee
Xu Yuan

Figure 6A

Names:
Adam Reese
Billy Childs
Cindy Hass
Edward Scissors
Henry Wink
Jenny Williams
John Smith
Kelly Brock
Li Long
Mary Sue Alt
Peter Wild
Roger Lee
Xu Yuan

Henry Wink
May 7, 2009
323 Ocean Crest
Los Angeles, CA 90049
424 555-1212 office
320 555-1113 cell
Lists:
Business
Holiday list
Celebrity TV Adam Reese
June 30, 2009
402 Beltway Blvd.
Los Angeles, CA 90049
424 555-1212 office
320 555-1113 cell
Lists:
Business
Holiday list
Celebrity TV Kelly Brock
March 15, 2009
101 Mulholland Drive
Los Angeles, CA 90049
424 555-1212 office
320 555-1113 cell
Lists:
Business
Holiday list
Celebrity TV Li Long
Dec 21, 2009
4522 Apple Core Street
Los Angeles, CA 90049
424 555-1212 office
320 555-1113 cell
Lists:
Business
Holiday list
Celebrity TV

*Figure 8*

RANDOM ACCESS TO PROPERTIES FOR LISTS IN USER INTERFACES

FIELD OF THE INVENTION

The present invention generally relates to graphic user interfaces (GUIs) and, more particularly, to GUIs that facilitate user access to virtual objects through lists of their properties which may be obscured or accessed only with difficulty in displays of virtual objects under modern user interface (UI) standards and current graphic design practices.

BACKGROUND OF THE INVENTION

While substantial reductions in the cost of data storage and increases in data processing or transfer speed of modern data processors, search engines, communication links and the like has provided the public and various enterprises with easy and rapid access to vast amounts of information, a limitation on efficiency of communication between a data processor or terminal and a user seeking particular information continues to be the ability of a user to assimilate information presented on a usually visual display device, referred to as a graphical user interface (GUI) or, simply user interface (UI). To a degree, the ability to assimilate information can be enhanced by graphic design of the presentation of information even though the attractiveness of the UI display may require the omission from the display image of information which may, in fact, be of interest to the user. In general, attractiveness of a UI is largely synonymous with "clean" and display of little or minimal and certainly abridged information, much less indicating the scope of available information or indication of how the additional information can be accessed while more information results in increased clutter of the UI which is difficult to review to locate the information of interest if the information of interest is, in fact, displayed. The incentive toward increased attractiveness of the displayed image is increased by its influence on the user to access information through particular facilities (e.g. particular applications or hardware) and/or resources (e.g. services, databases) that provide comparatively more attractive displayed images.

Further, the recent growth of electronic commerce is likely to provide further incentives toward attractive displayed images in which information about real world or virtual objects is presented in a unitary grouping as a virtual object where the attractiveness of the displayed image may convey strong inference of the desirability of the object that is represented. Indeed, at the present time, UIs are typically built on the concept of having users interact with virtual objects in much the same way they would interact with real world objects. For example, lists of so-called e-mail objects or icons or images representing them can represent letters written or printed on paper that could be (and previously were) mailed with a stamp. As a result, user interfaces have been developed to allow access to and interaction with many types of real or virtual objects which have previously been displayed in lists and tables, for example, with rows corresponding to particular objects and the respective properties of the objects organized in columns, which users could browse and from which users could select and then act upon. However, contemporary UI design standards and accepted practice have moved away from the traditional rows-and-columns format of such lists (e.g. menus which may be hierarchically nested) and tables, apparently in the interest of providing more visually attractive interfaces or images and emphasizing the nature of data records that parallel and represent existing real or virtual objects.

Currently popular UI virtual object designs use so-called pictured lists containing some type of graphic illustration and a listing or summary of only the properties of the object that are considered to be most important or most often of interest that more closely resembles an annotated photograph than a table. The chosen format often resembles a business card, both in layout and content. For example, in a modern list for music, the pictured list would contain, for a particular real world object, a picture of an album cover for a recording, the title of the album, the artist and the cost while much more information may be available (e.g. media on which the music is available, performance duration, technical data, production personnel, music type or category, date(s) of recording/performance, reviews and commentary and the like). It should be appreciated that such an association of an object identity and an arbitrary number of properties will exist for all real-world and virtual objects including more-or-less fungible commodities and chemical compositions and the data or database records representing them.

As a result of the trend toward more graphical portrayals of objects by UIs, many of the strengths and facilities of lists and tables such as easy filtering and sorting and locating of other objects having one or more desirable properties in common with a given object have been greatly de-emphasized and access to information which may be available has been made much more difficult by the use of the so-called pictured lists alluded to above. Even determining the properties for which data exists in storage for a given object may require difficult and complex user actions in regard to individual objects that is likely to be subject to user error.

SUMMARY OF THE INVENTION

It is therefore an object of the present invention to provide a simple and intuitive technique and facility for providing browsing, sorting and filtering of randomly accessible data records and data fields therein in accordance with properties of real-world objects represented by abbreviated and attractive virtual objects on a user interface.

It is another object of the invention to provide facilitated random (e.g. content specific) access to all properties of an object for which data exists in a data record for that object.

It is a further object of the invention to facilitate sorting of objects and access to virtual objects based on a particular property or properties of objects that may be accessed in a random fashion.

It is yet another object of the invention to provide for browsing, sorting and filtering of randomly accessed data presented to the user as a pictured list or other format which, at most, only summarizes selected properties.

In order to accomplish these and other objects of the invention, a method of accessing data in a database from a virtual object image corresponding to an object having properties is provided comprising displaying said virtual object image on an interface, displaying a drag icon at a location associated with the virtual object image, displaying a ghost template in response to the drag icon being moved to another location, the ghost template containing a list of types of properties of the object represented by the virtual object image, selecting a type of property of the object by dragging the drag icon to a property type displayed by the ghost template, displaying all instances of the type of property selected, selecting an instance of the property by dragging said drag icon to an instance of a property to define a selected instance and displaying another virtual object image corresponding to another object ct image including the selected instance and another property of that object.

In accordance with another aspect of the invention, a method of accessing data in a database associated with at least one data processor from a virtual object image corresponding to an object having properties is provided comprising configuring at least one data processor to provide a display of a drag icon image in association with a virtual object image, configuring the at least one data processor to display a ghost template in response to dragging the drag icon, the ghost template displaying all property types for which data is stored for said object having properties, configuring the at least one data processor to display all instances contained in said database of a property type selected from the ghost template; and configuring the at least one data processor to display another virtual object image including the selected instance.

In accordance with a further aspect of the invention, an apparatus for accessing arbitrary information in a database comprising an image generator for generating a virtual object image including a drag icon and a ghost template, a comparator for detecting motion of the drag icon and controlling the image generator to access property types of an object for which property information is stored in a database and display a ghost template which contains the property types when motion of the drag icon is detected.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
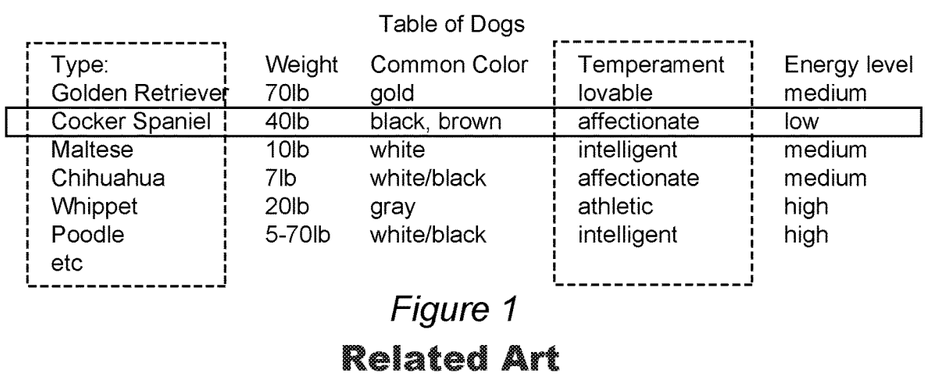
FIG. 1 is an illustration of an exemplary traditional table forming a user interface.

Referring now to the drawings, and more particularly to FIG. 1, there is shown a traditional table as presented to a user on a user interface (UI) display. This format for a user interface display image was extremely popular until about 2010 and continues to be used for spreadsheet displays and the like. It is to be understood that this table is arranged for facilitating conveyance of an understanding of the invention and the relationship of such a format to UI display formats that are currently gaining in popularity and no portion thereof is admitted to be prior art in regard to the present invention. FIG. 1 is thus labeled "Related Art".

The solid line rectangle overlaid on FIG. 1 represents a row, the entirety of which is associated with and represents a given object. The dashed line rectangles overlaid on FIG. 1 represent columns and a given column will typically correspond to a particular (somewhat generalized) property of respective objects which correspond to each other across the plurality of objects represented. (Unless the context indicates otherwise, the terms "object" and "property", whether singular or plural, are used herein in the expansive sense in which they are understood in object oriented programming in which an object will be of a specified type, can represent any entity and may possess any number of properties, including properties possessed through inheritance.) The generalized name of each property or object is typically displayed at the top of each column as a fixed row of the display for user reference. For example, the name of an object traditionally displayed in the first or left-most column (which may also be displayed in a fixed format, for reference) is the primary property by which the object is known and the somewhat generalized properties displayed at the top of each column are basically corresponding categories or types of properties of the collection of objects. The indicia displayed at each intersection of a row and a column represent the text (if any) of a field in a data entry in a data record that may form part of a database. The number of objects/rows and columns/properties is arbitrary and the table image can generally be panned (e.g. moved horizontally) and/or scrolled (e.g. moved vertically) to provide visibility of any data contained in the table even when the extent of the table, generated at a size sufficient for legibility, substantially exceeds UI screen dimensions. For example, if the data is the information contained in a database of the data processing equipment which is interoperable in an enterprise, there may be hundreds of objects and the properties associated with each object/computer (e.g. processor type, clock speed, memory capacity of each type of memory or memory device, peripherals, security provisions, available applications and processing capabilities and the like) can be quite numerous, as well. Other tables or lists may be hierarchically nested below each column and row intersection to allow the user to "drill down" to view underlying data, comments, notes, and metadata that support the text at a given row/column intersection.

Figure 2:
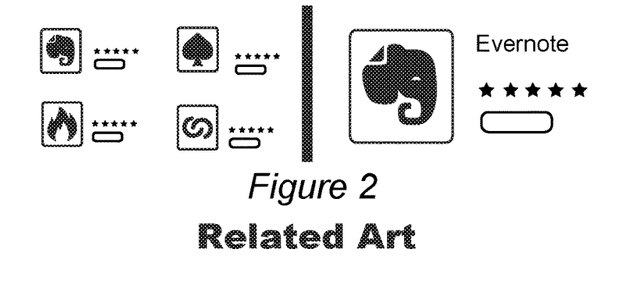
FIG. 2 is an exemplary display of a pictured list (or portion thereof) and a magnified item contained in the pictured list.

Referring now to FIG. 2, which is also labeled "Related Art" for the reasons discussed above in connection with FIG. 1, an exemplary pictured list (also known in the art by many other terms as well as being exemplary of other types of lists or collections) that is of a type enjoying increased popularity at the present time is illustrated for contrast with FIG. 1. In the particular pictured list illustrated in FIG. 2 the left side contains a display of four virtual objects forming the pictured list, itself, and the right side displays a magnified image of a selected one of the virtual objects included in the pictured list displayed on the left. Information included in the magnified image is very limited but is also contained in the corresponding virtual object image in the pictured list in which the information is typically too small to be legible but the object can still be recognized and selected at will in accordance with the "thumbnail" graphic image included therein. Typical properties for an arbitrary commercially available object selected for inclusion within the respective virtual object displays will be, for example, an image, application name, application type, rating and type or mechanism of purchase although many more types of properties may be available. Due to the limitation of information provided in this type of image, no sorting capability is generally provided and, at best, only a detached "filter by" function is typically provided.

It should be appreciated that a conscious and physical user interaction with the interface is required even to achieve legibility of the small amount of information provided. Therefore, it is clear that while the interface image of FIG. 2 emphasizes the relationship of information to specific virtual objects representing other (e.g. real world) objects and the displayed image is more attractive, engaging and quickly assimilated than that of FIG. 1, more numerous physical user operations are required even for rudimentary levels of use while some information potentially of interest is made unavailable or accessible only with substantial mental attention and consumption of user time and both physical and mental effort.

The invention, as will now be described in detail below, provides a simple and limited set of highly intuitive operations the user can easily employ to obtain access to other virtual objects or pictured lists and access other information to the level that it may exist in the entire data base. The number of steps required is also very limited for convenience of the user and to shorten the time required for the user to access the information of interest as will now be described with reference to FIG. 3A. Specifically, as shown at the lower left of FIG. 3A, an image of an original virtual object that the user has accessed is shown. A comparison of this image 30 in FIG. 3A with the enlarged virtual object image of FIG. 2 reveals that a similar graphic image and comparable limited number of text items reflecting properties are displayed. However, an icon 31 of arbitrary shape, size and location and any other desired visual attributes (e.g. color) is displayed within the boundary of the virtual object image. A triangular solid image of the icon 31 is chosen for simplicity of illustration in this particular depiction. No legend or instruction to the user is necessary or appropriate since, as will be described below, the icon will have several different functionalities depending on context or the phase or step of utilization which will be appropriately invoked by similar and possibly continuous user interaction with the icon in each case. While it is preferred for simplicity and utilization of interface image area that only a single virtual object image be displayed, the display of additional information or virtual object images is unimportant to the operation or practice of the invention and can be provided, if desired. On the other hand, it is also considered to be desirable to provide for dragging the virtual object image (e.g. by user interaction with some other area of the virtual object image) to any desired location on the interface display area and to provide for other images invoked in the course of operation of the invention to be overlaid over any other interface images or information that may be present. Both of these capabilities are common and well-known in the graphical or visual design arts as well as the visual display arts.

Figure 3A:
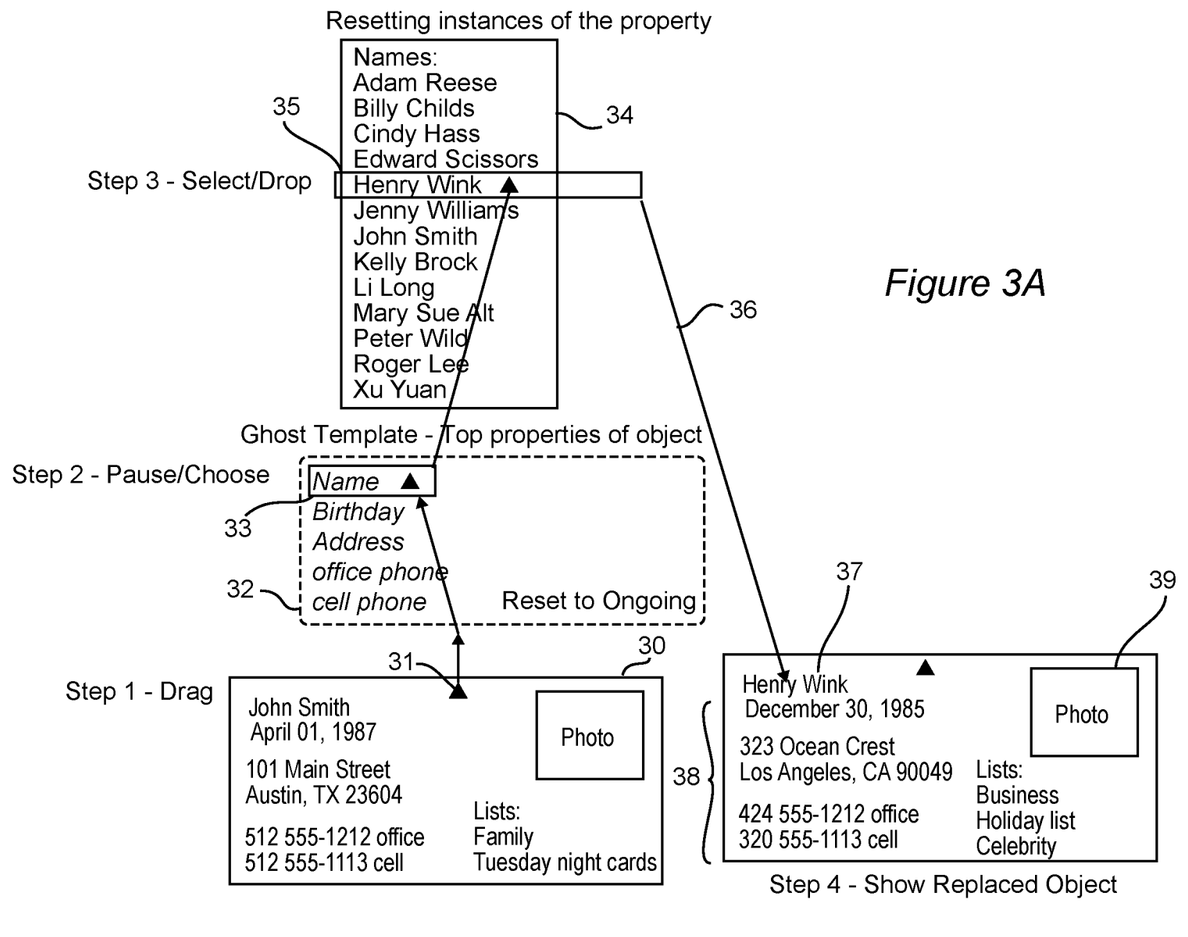
FIG. 3A is an illustration of exemplary user actions utilized in operation of the invention by a user and the displays invoked thereby.

To begin use of the invention to access additional or alternative information, the user first selects the icon 31 using any known cursor manipulation technique or hardware such as but not limited to a mouse, stylus sensing or finger touch on a touch-panel display and dragging the icon to a different location. It is preferred that any movement of the icon, however slight, be detected but that some location tolerance be provided for a return of the icon to its original location in the virtual object image, in the event the user decides to reverse the invocation of the invention. Movement of the icon 31 outside the boundary of the virtual object image is also considered to be a suitable criterion for invocation of the invention and in such a case, the invocation can be reversed by returning the icon within the virtual object image boundary, regardless of location within that boundary.

Upon such a movement of icon 31, a second step of providing an image referred to in this discussion as a ghost template 32 is displayed, preferably at a location and in a shape or area which does not significantly overlie the original virtual object image area since a potential ambiguity of control might result. As illustrated, the ghost template contains a list in any convenient or desired format of all of the types of property data for which a value is specified in the data in a data record for the original virtual object or, alternatively, for all types of property data specified in other comparable data records of the data base. These types of data correspond to the property data types that would be displayed as fixed column headings as alluded to above in connection with the tabular display of FIG. 1. The user can then simply continue to drag the icon 31 to a selected property data type or re-select/acquire the icon and drag it to the desired location/property data type. When the location of the icon coincides with the location of a displayed property data type, that property data type is determined to have been selected, either automatically and immediately, as is preferred, or in response to an additional selection action of the cursor control facility or mechanism such as a mouse click or touch-screen gesture.

Alternatively, if the icon is dropped and the ghost template is displayed but the user wishes to reverse the invocation of the invention, it can be provided that tapping of the cursor control device on any area outside the ghost template image will dismiss the ghost template and return the drag icon to its original location. Such a control function would be desirable if the user did not see a property type of interest in the ghost template image. In such a case, the user may seek an information type of interest by switching to another virtual object and virtual object image that may include data for the property type of interest.

However, it should be appreciated that the ghost template can accommodate many more property types than the pictured list or even columns of the tabular UI of FIG. 1 without incurring substantial additional effort in panning the tabular interface. Typically, tabular (non-spreadsheet) interfaces are limited to four to twelve columns by the text length of the property type names (which must be displayed in a horizontal row of the table) whereas the ghost template is in the nature of a list and only limited to the number of text lines that can be accommodated on the UI screen. Up to fifty property types (approaching the scale of many spreadsheets) aligned in a single column can usually be accommodated without scrolling. Of course, multiple columns may also be provided in the ghost template. Therefore, such an action to dismiss a ghost template should become more rare with larger databases collecting more types of properties but such an operation may remain useful for correcting user errors in operating the invention.

When it is determined that a selection of data/property type has been made, a third phase or step of the process of simplified and facilitated random/arbitrary access to property data is begun by displaying a list of instances of property data of the selected type. As illustrated in FIG. 3A, for example, the property type, illustrated as highlighted at 33, is (in this case where the "name" property type has been selected) a name of a person such as names of members of a group such as e-mail correspondents of the user. The actual names in list 34 are the instances of all of the different names for which that particular property data has been provided and will, in this case, be exhaustive of all objects since each object is known by and thus necessarily has a name. Other properties may not be provided/specified for all objects. The user may then reacquire and drag or simply continue to drag the icon to a particular desired name/instance in list 34 which causes the instance to be highlighted to confirm the correspondence of the drag icon location with a particular displayed instance as illustrated at 35. Selection of an instance can be performed in numerous ways such as a mouse click, touch-screen gesture or the like but it is preferred that selection be performed by dropping the drag icon on the displayed instance to be selected. Thus, the completion of user input to select a new virtual object coincides with the completion of a (possibly interrupted but potentially continuous) drag-and-drop action by the user; further enhancing the intuitive nature of the operation of the invention.

Then, as the fourth step of operation of the preferred embodiment of the invention, the selected and highlighted instance 35 moves to the location in original object 30 designated for the selected property (e.g. 33) as specified by the user in the second operational step in accordance with the invention as discussed above. Alternatively, the user may drag the selected instance to a desired location to, in effect, specify a desired location for a newly selected virtual object image. This operation is depicted by arrow 36 in FIG. 3A. This facility would normally be provided as a function of the host system rather than the invention but the possible interaction of the invention and the host system at this point is regarded as a perfecting feature of the invention but is not necessary to the successful practice of the invention in accordance with its basic principles.

While not required for the successful practice of the invention but as a further perfecting feature thereof, particularly where a provision is made for dropping the icon onto the selected instance, it is preferred that this action be displayed with animation such as moving the selected and highlighted instance information across the interface display area to the desired or specified original location along a straight or curvilinear path over a perceptible period of time. This may be accomplished in many ways which will be apparent to those skilled in the art such as duplicating the image area of the selected and highlighted instance information and moving that image area in the horizontal and vertical directions by a fraction of the distance to the desired final location in the original object image or another location at a different "Selected Object" location at time-separated intervals such as the frame refresh rate or some small multiple thereof. It is considered that this animation conveys a better sense of completion of the operation of the invention (subsequent to the final user action required for selection) to provide the desired random access to information that may not otherwise be visible in the object image. As a practical matter, the duration of the animation provides time for the system to fetch the remainder of virtual object information (as specified for the pictured list format) for the replaced object image or an image of the remainder of the replacement object including the short list of properties 38 and picture 39; the display of which preferably coincides with the time the selected instance information reaches the final desired location 37.

Of course, consistent with currently standard use of abbreviated pictured lists and virtual object image formats currently favored, the virtual object image developed through use of the invention will generally contain information of only the most often desired types and usually far less than all properties possessed by the selected object that the virtual object image represents. Other property types and property instances can be accessed by further drag icon manipulation. For example, if a user wished to confirm that a newly selected virtual object also possessed one or more other properties of interest, the selection of an instance in a further sequence of operations as described above could be provided with an intermediate step for showing the instance of a particular type of property possessed by the currently selected object. Such a facility could be provided in any of several ways such as displaying the particular instance for a highlighted property type during a short delay before determining a property type selection to have been made. During this delay, the user could move the drag icon to additional property types (with the delay being reset when a highlighted property type is changed) to review the respective instances of different property types prior to display of all instances of a selected property type. Alternatively, instead of a delay, a "show all" option could be provided in the display of the particular instance or the "show all" function could be performed in response to a cursor control action such as a double-click with a mouse or a corresponding touch-screen gesture. While such a function is regarded as yet another possible perfecting feature of the invention, it may also provide for reducing the frequency of database queries for all instance of a property type across the entire database and thus reduce the processing burden of operation of the invention.

Referring now to the flow chart of FIG. 3B, the operation of the invention will be discussed in connection therewith. It may be helpful to the understanding of some preferred or perfecting features of the invention that may be less than fully evident from FIG. 3B to refer to the state diagram of FIG. 3C and the architecture represented by the block diagram of FIG. 3D during this discussion and the following description of some features of the invention will be directly referred to in this discussion. While FIGS. 3C and 3D will be discussed in detail below, some parenthetical reference numbers will be provided in the following discussion of FIG. 3B to facilitate reference thereto. In general, the state diagram may more clearly depict the particular actions of the user to which the invention desirably responds. It should be understood that the depictions of various elements on FIG. 3D are simply exemplary and schematic depictions that could be employed to support the functions of the invention and that other equivalent expedients and functional elements will be apparent to those skilled in the art or, preferably, be formed from portions of a general purpose data processor by suitable programming to establish particular structural elements having the desired functions.

Figure 3B:
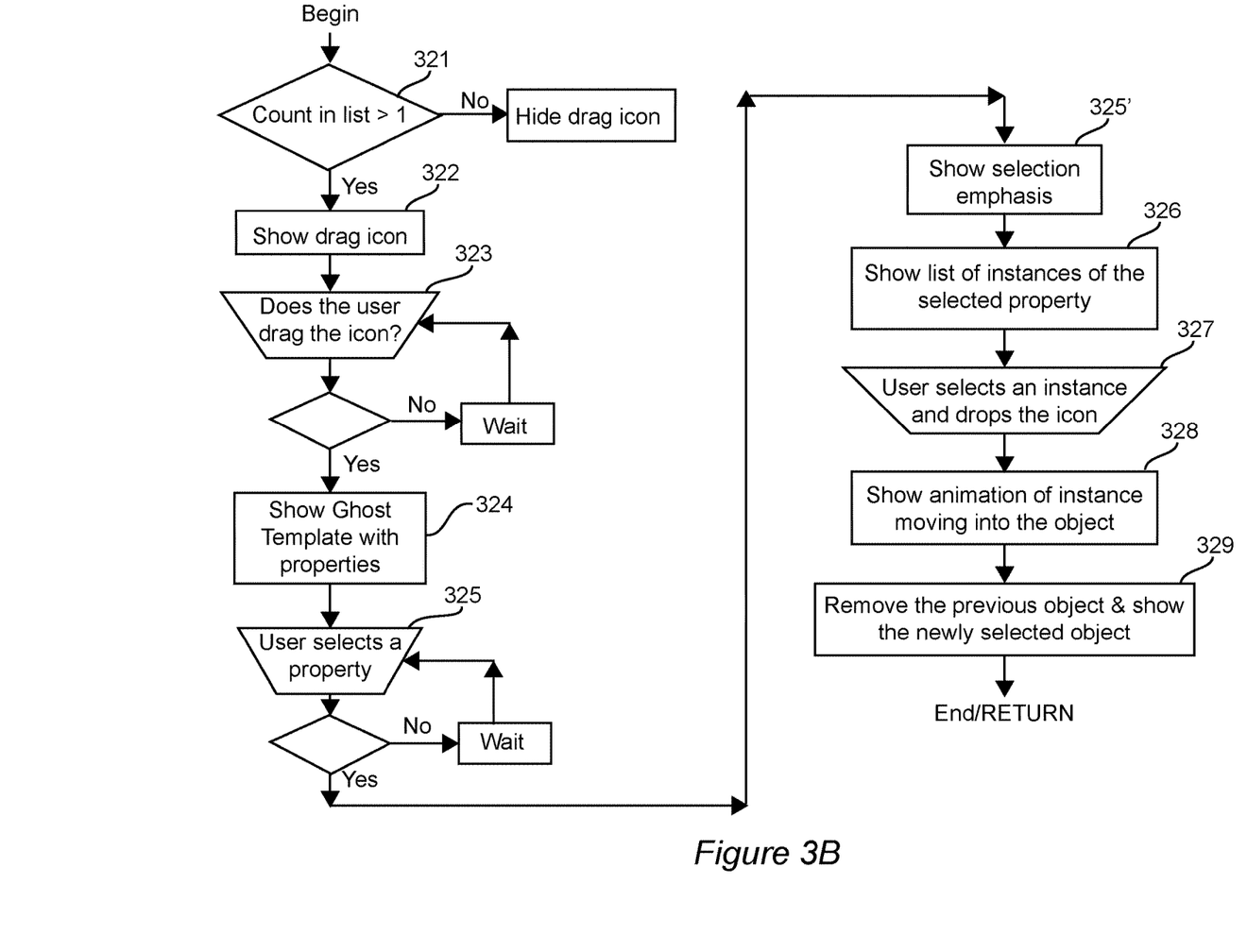
FIG. 3B is a flow chart of operations performed by the invention in the course of its use to locate a desired virtual object.

As depicted in FIG. 3B, the operation of the invention begins at some arbitrary point in some user interaction with the overall data processing system to retrieve some data which the user desires and it is assumed that some data (which may or may not be the data desired by the user) has been retrieved. It should be kept in mind that the basic function of the invention is to enable the user to have random access to any and all objects and properties known to the system; which access might have been provided in the past by exhaustive data in a tabular format, and to facilitate browsing, sorting and filtering functions that may be compromised in complexity or directness of access by recently preferred formats and display images of virtual objects. Therefore the process depicted in FIG. 3B starts with the word "Begin" to denote the invocation of the processes which the invention facilitates, even as compared with a tabular display format.

As alluded to above, it is assumed that some data has been retrieved by earlier manipulations of the system by the user such as conducting a database query or the like in a manner entirely independent of the operation of the invention. These manipulations may return only a single record or virtual object or a plurality thereof. Since operation of the invention is trivial and irrelevant (and thus counterproductive) in regard to a single returned data record (since sorting or filtering may be performed on properties already displayed if the single returned virtual object is not the information of interest), an initial operation 321 (331 of FIG. 3C) is performed to determine if only one or more than one record has been returned and, if only one record is involved, the icon by which the invention is operated is hidden (331' of FIG. 3C) in the virtual object display and the process of the invention is not invoked. However, if more than one record or virtual object has been returned it/they will be displayed with an arbitrary icon or symbol displayed (322) at an arbitrary location in regard to the location of the virtual object image(s). It is preferred that the icon be displayed at a consistent location (specified at 351 of FIG. 3D), preferably centralized and within the border of the virtual object, as illustrated at 31 of FIG. 3A. Thus the visibility of the icon (sometimes referred to herein as a "drag icon" in view of the nature of the user's interaction with it) serves to indicate to the user that the invention is available for facilitating additional data processing operations. The icon can be displayed on only a selected and enlarged virtual object image or may be displayed on each or selected ones of the virtual objects displayed in the pictured list. The icon can also be used to select a virtual object from the pictured list to be displayed in a larger virtual object format. It is preferred that the choice between operation from either or both of a pictured list and/or a magnified virtual object image be concurrently provided together with the capability of a user to freely switch between such types of display format or concurrently display them and to select virtual object images from the pictured list to be displayed in an enlarged virtual object format as shown at 332 and 333 of FIG. 3C.

Figure 3C:
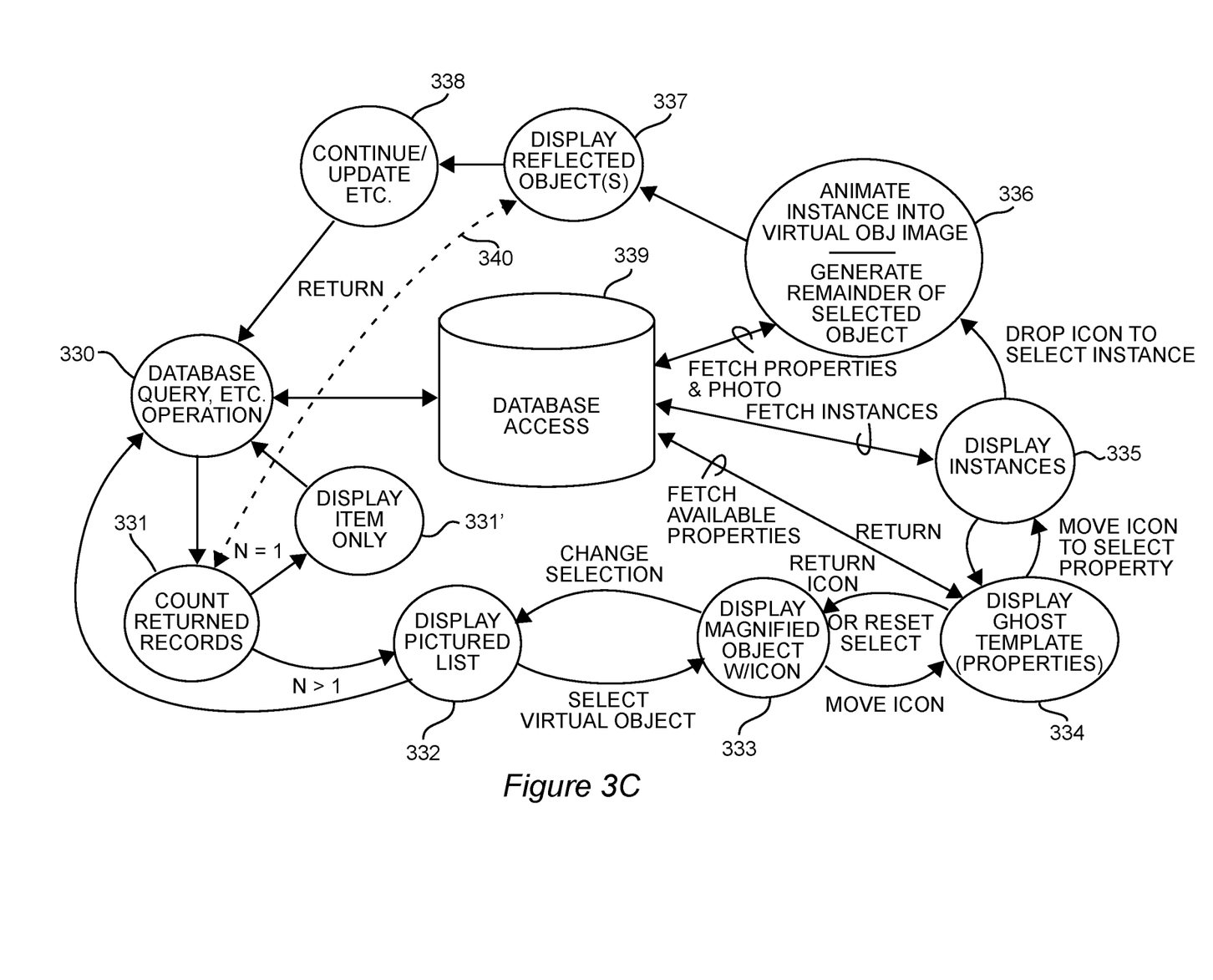
FIG. 3C is a state diagram illustrating operation of the invention in response to user interaction in connection with a user interface.
Figure 3D:
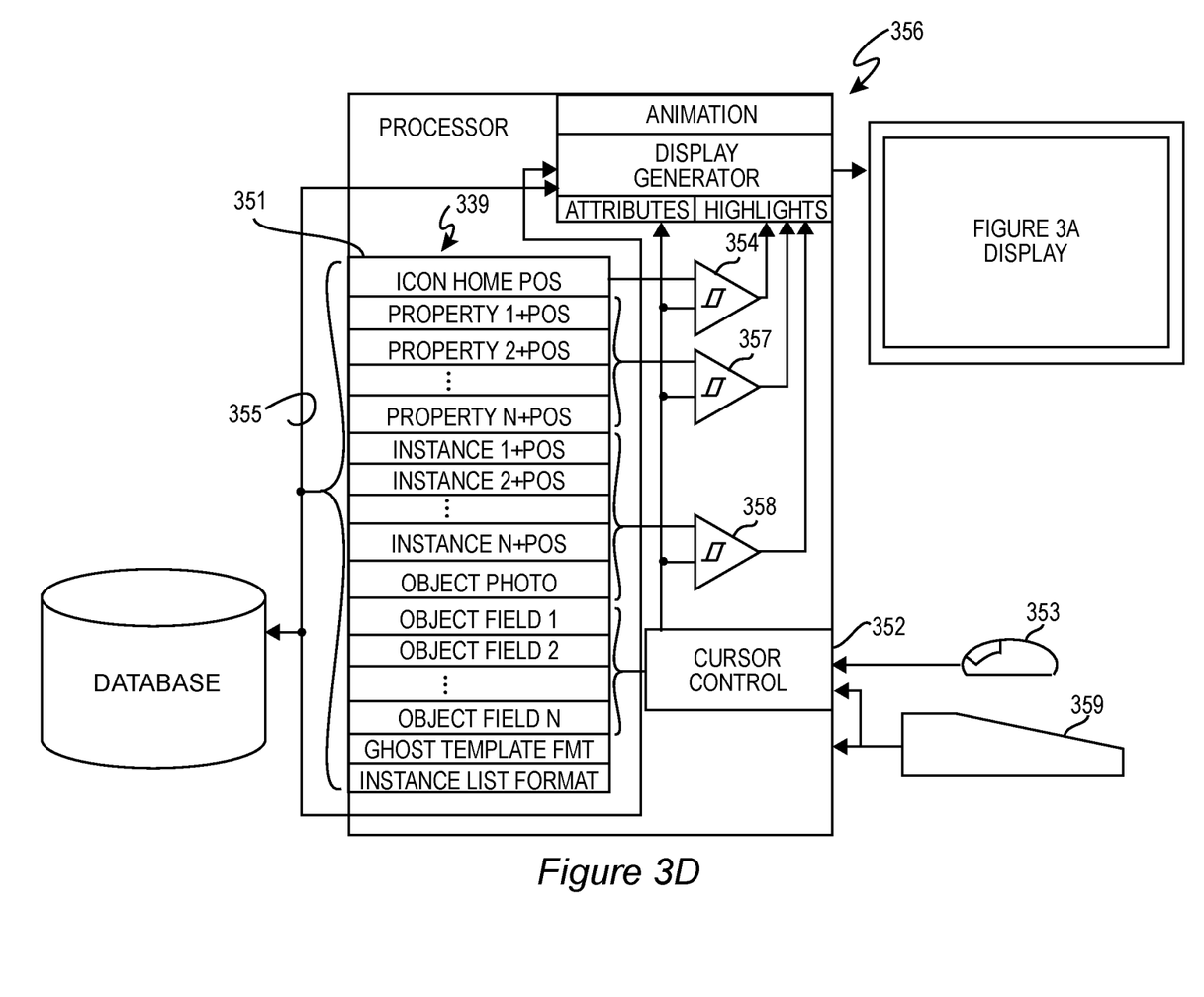
FIG. 3D is a block diagram of the functional elements in accordance with a preferred embodiment of the invention.

If the icon is displayed and the facility of the invention is available, it is determined if the user drags the icon as shown at step 323 and state 333 of FIG. 3C while in a wait state that continuously or periodically returns to state 323 until dragging of the icon occurs. When dragging of the icon is detected, which can be accomplished by comparison of the icon "home" position 351 (FIG. 3D) and the position specified by cursor control 352 using a mouse 353 using a comparator 354 (preferably having a degree of positional tolerance) or some other expedient that will be apparent to those skilled in the display art. In response to such a detection of dragging of the icon, a ghost template is displayed 324 in accordance with a format stored in and fetched form memory 339 as shown at state 334 of FIG. 3C (which includes an access operation of memory 339) is displayed by controlling the display generator 356 to display Property 1-Property N information (which can be panned or scrolled if properties are more numerous than can be legibly displayed in the areas available or desired for the ghost template) delivered with corresponding display position data for each property over connection 355. This state essentially provides a list of properties for which data entries have been made for the object and its representation by the current virtual object. The user can then continue or resume dragging of the drag icon to a property in the list formed by the ghost template to select a property as shown at 325 (also including a wait loop) and state 335 or return the icon to its original position to return to state 333 from which a virtual object selection can be changed at state 332 and the process resumed with the new selection. Preferably, when the icon is moved to a particular displayed property as determined by comparator 357 but before a selection is made, the text of the property is displayed with an attribute such as highlighting and the display attribute changed such as underline, boldface characters or color change when a selection is made (327) by the user as illustrated at 325' of FIG. 3B.

Figure 4:
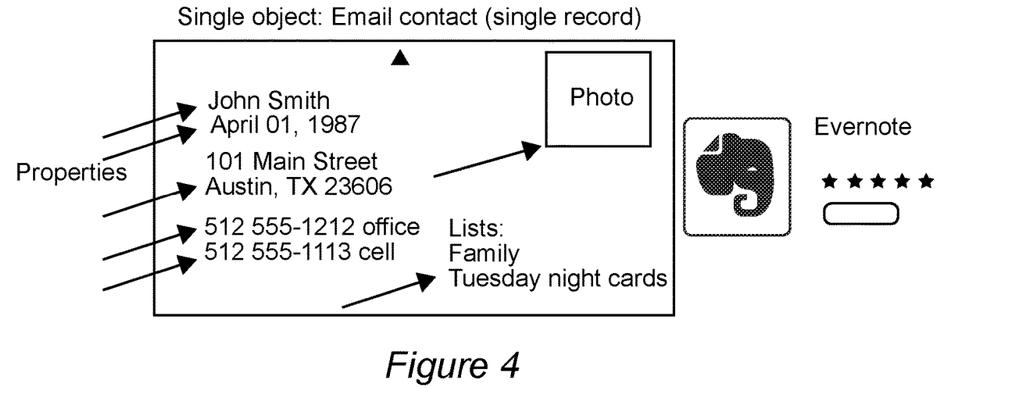
FIG. 4 is an exemplary display of an original virtual object in accordance with a preferred embodiment of the invention, FIGS. 5A and 5B respectively illustrate an exemplary ghost template image in accordance with the invention and a representation of an exemplary operation conducted by interaction therewith.

When a selection (327) has been made, a list of instances (e.g. a listing of all data entry value instances of the selected property type) is displayed as shown at 326 in much the same manner as the ghost template as described above with the text and position information being fetched from memory 339 along with property list format, including list position. Panning and/or scrolling of the list is considered preferable, particularly since the number of instances is likely to be very large even after instances with identical text are removed. While it is possible to provide for the ghost template to be deleted from the display at this point, it is considered preferable to maintain it on the display or interface to allow the user to return to it as shown as a return to state 334 in FIG. 3C by, for example, dragging the icon outside the instances list. The user can drag the icon through the instances list with alteration of the display attributes of the displayed text as the icon is dragged or hovers over each entry as detected by comparator 358. Selection (327 of FIG. 3B) of an instance can then be made (illustrated by an arrow in FIG. 3C) by dropping the icon on the displayed attribute. The selected instance is then displayed as shown at 336, preferably by animation of moving its position to the corresponding position on the original virtual object or a replacement virtual object as alluded to above with or without further alteration of the display attributes of the selected instance while the remainder of the property values corresponding to the replacement virtual object are fetched from memory 339 for display, concurrently with the selected property instance as illustrated at 337. Animation can also be applied as desired to the replacement of other property text values and/or graphical portrayals of the replacement virtual object as shown in FIG. 4. From this point, the user may resume operations such as updating, or by acting upon the newly selected object with the actions provided by the system for that type of object as shown at state 338, after which any other operation by the user may be performed as shown by return of the state to 330.

It should be appreciated from FIG. 3C that the invention provides a sequence of states that provide additional functions and memory accesses that cannot be specified or otherwise accessed from a pictured list or virtual object of modern design in which only the information which is of interest most frequently is displayed. This sequence of states always returns to the state from which the process in accordance with the invention is entered. Moreover, states 332-335 also provide for return to their previous states and sequentially to state 330 if the user does not perceive the results of any of these states to be progressing toward the result of interest and/or to reverse inadvertent or erroneous operation of the invention at any point before state 336 is reached (at which point, state 330 can be reached most expeditiously by continuing from the replacement object).

It should also be appreciated from FIG. 3D that the functionality of the invention to provide random, (e.g. content addressable) access to properties and objects in the system requires only that the most rudimentary of functional elements be developed by particular configuring of the processor to provided registers or specification of memory locations to store the text and display location of properties and instances and respective comparators to detect cursor movement that can be performed with, for example, a mouse 353, keyboard 359, touchscreen 360 gesture or the like, to or away from particular interface display locations. Therefore, the invention can be easily implemented in a small amount of software or hardware or a combination thereof.

Thus, in summary of FIGS. 3A-3C, the basic operations and user interactions in accordance with the invention are a.) show a virtual object resulting from an action provided by the host system, b.) show all property types for which data has been provided for the object, c.) select a property type, d.) show all instances of that property type, d.)select an instance, e.) display virtual objects corresponding to the selected instance, f.) select a virtual object, and g.) display the corresponding selected virtual object at the same or a different UI location as the original virtual object. Through the use of the invention, the user has been provided with highly efficient and intuitive access to any arbitrary information that may be contained in a database, providing effectively random access in a manner consistent with currently preferred display formats for virtual objects (e.g. having reduced information content) and without cluttering the screen or increase of difficulty in assimilating information displayed on a UI by presenting categories of choices in a logical and hierarchical and intuitive fashion which serves to facilitate assimilation and user interaction.

It should also be appreciated that the invention can be used to switch virtual objects as alluded to above to obtain a ghost template image with a property type of interest. For example, if a user is browsing an e-mail contacts list for a name that is not accurately remembered but is known to be in a particular location (or have some other property in common therewith), a virtual object corresponding to another person known to be in another location (or share another property with the person of interest) can be used to access a location property (or other common property) to obtain a short list of all persons in a particular location, from which a choice can be made. Conceptually and in the context of a tabular UI such as that of FIG. 1 with objects vertically arranged and properties horizontally arranged, the user could scan across the properties at the tops of columns to find a property that is likely to be in common with the object of interest and then scanning vertically through the list with only that property in the list. with either the tabular UI or a virtual object image, the basic function is that of filtering but the ghost template in accordance with the invention and listing of instances of a particular type of property is more intuitive and immediate. Further, although the effect is more subtle, the methodology of the invention actively involves the user in generating the "filter by property" action while the UI is at all times cleaner and more easily assimilated by the user, particularly in comparison with drop down menus or dialog boxes while much more efficiently utilizing UI display area.

Figure 5A:
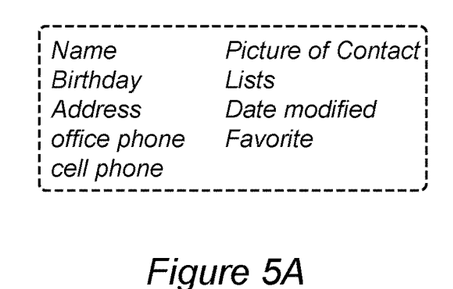
Figure 5B:
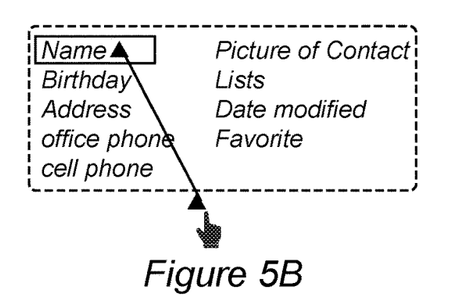

FIG. 5A illustrates an exemplary ghost template and FIG. 5B illustrates selection using an exemplary touch screen gesture. The exemplary ghost template of FIG. 5A contains an exhaustive listing of properties corresponding to properties for which data entries exist in a given database. It should be noted that the "lists" property refers to groups of virtual objects that may have a similar quality or logical connection such as document objects, contact lists in an e-mail application or celebrity. These lists may have sub-lists such as motion picture, actor, musician or television for the celebrity list. The properties of a virtual object as shown in FIG. 5A and 5B are thus one or more names of lists in which the virtual object appears, if any, which are presented in the virtual object image, preferably following a fixed heading such as "lists:" (including a colon). It should be noted that properties of the virtual object or metadata (e.g. date modified) can be included as properties in addition to the properties of the real-world or virtual object represented by the virtual object image. FIG. 5B illustrates dragging the icon from outside the ghost template area to a particular display/data field corresponding to a property and the highlighting of the property that will be selected upon a selection gesture such as a tapping of the touchscreen or particular manipulation of the cursor control device. In this case, the property type "name" is selected to cause accessing of instances of that property from memory for display.

Figure 6A:
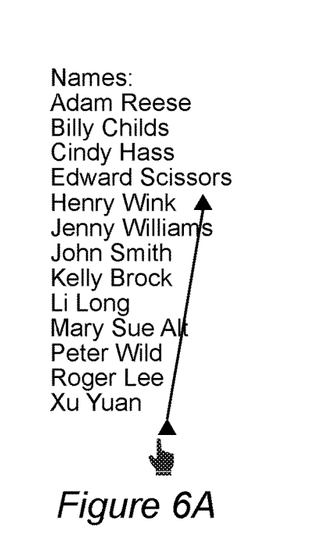
FIGS. 6A and 6B are an exemplary list of instances of a selected property invoked by the operation illustrated in FIG. 5B including illustration of a selection of an instance and highlighting of a display of a selected instance.
Figure 6B:
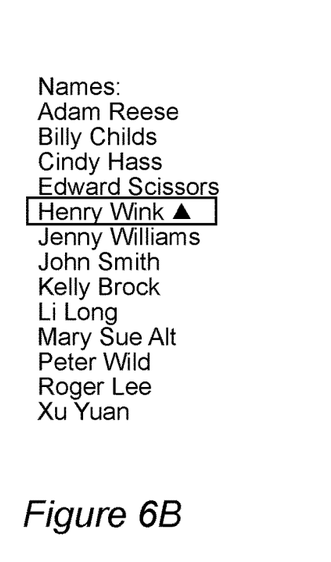
Figure 8:
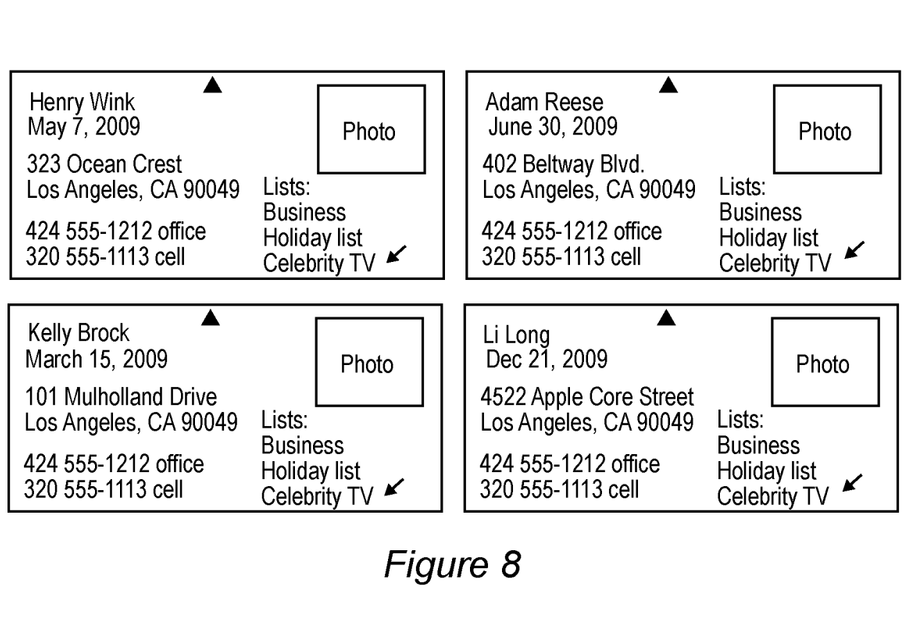
FIG. 8 is an exemplary pictured list provided by a preferred embodiment or perfecting feature of the invention where sorting and filtering returns multiple results.

FIG. 6A illustrates the further display of an instance list which is displayed in response to selection of a property from the Ghost template. Specifically, after selection of a property and memory access, a list of instances of the selected property type is displayed as alluded to above. In the case, since the property selected was "name", the instances are the different particular names in the database. The display preferably includes the fixed heading "Names:" to confirm the property type selected by the user. Note that the name listed in the original virtual object, John Smith, also appears in the list of instances and could be selected to return to the original virtual object or, importantly, selected to determines all virtual objects with the common name "John Smith" as will be discussed below in connection with FIG. 8. As illustrated by the solid arrow and hand outline, the user continues or resumes dragging of the drag icon to a name of interest, in this case, the name of Henry Wink which is then preferably highlighted as shown in FIG. 6B.

Figure 7:
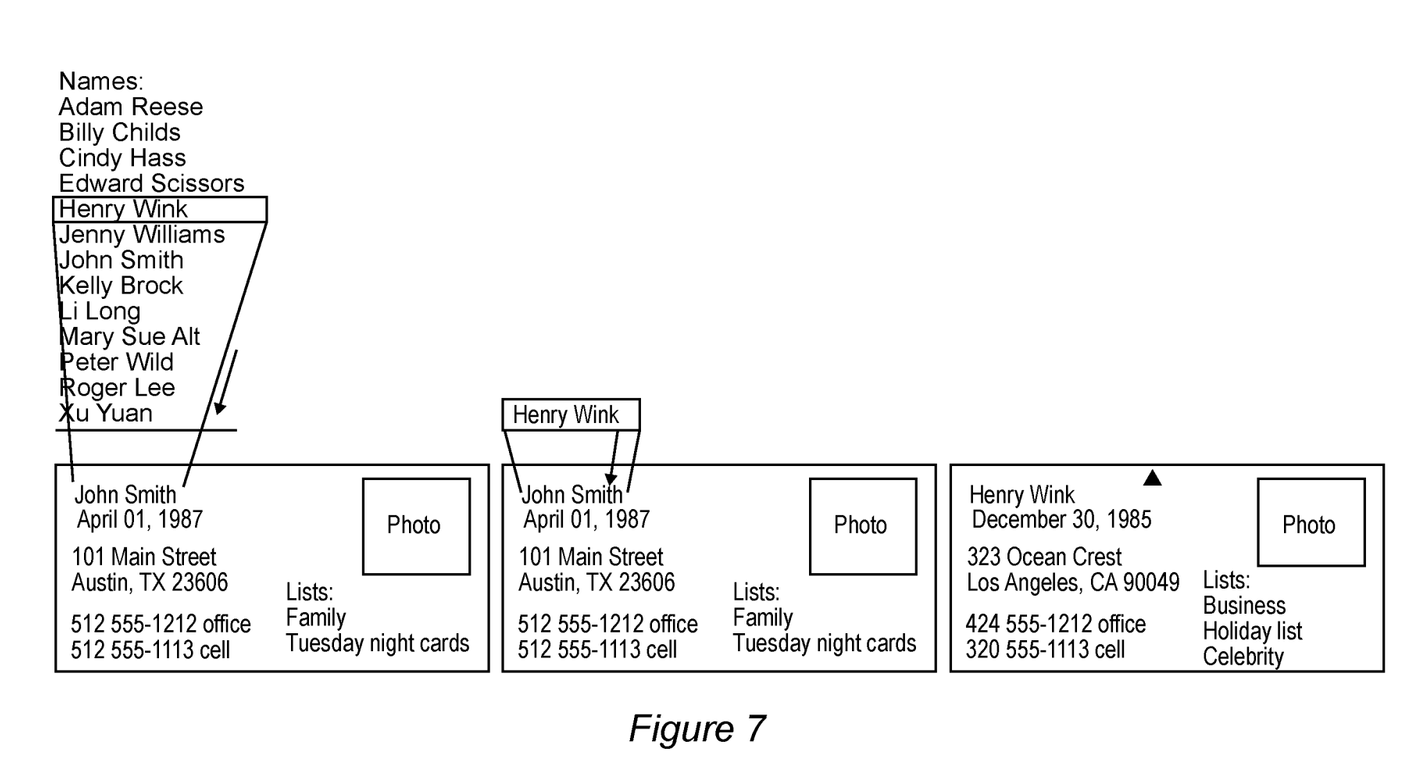
FIG. 7 illustrates a sequence of a preferred animation to form a selected (through use of the invention) virtual object image user as provided by a preferred form of the invention.

If the icon is then dropped on the selected instance of Henry Wink, its substitution in the original virtual object image or placement in a different virtual object image is displayed, preferably by animation as depicted by arrows in FIG. 7 (328 of FIG. 3B) resulting in "Henry Wink" being displayed, rather than John Smith. Then, as alluded to above, the remaining instance information for the respective properties of the virtual object image corresponding to Henry Wink are substituted for those of John Smith or displayed in connection with the Henry Wink virtual object image (329 of FIG. 3B), the photo updated or included and the drag icon again displayed. Note also additional properties of "celebrity; TV" are also displayed for Henry Wink that were not displayed for John Smith who did not have corresponding data entries in the list objects in the database. It is also possible that the "John Smith" virtual object was initially selected at random for the purpose of invoking the operation of the intention when the property data of interest was simply "celebrity" and the "Henry Wink" instance selected as being known to the user as a person having the "celebrity"

property instance. In such a case, the invention would cause the database to return more than one virtual object which would then preferably be displayed on the interface as a pictured list such as that shown in FIG. 8 (or the left side of FIG. 2, as discussed above). This functionality is illustrated by the dashed arrow 340 from state 337 to state 331 in FIG. 3C as a starting point for a further utilization of the invention to, for example, find an address or other arbitrary property of "Li Long". Note that all virtual objects displayed in the pictured list are displayed with drag icons indicating that the invention remains invoked and further random access of data in the database can proceed immediately at the will of the user.

In view of the foregoing, it is clearly seen that the invention can greatly facilitate random and plenary access to the entirety of a set of data in a database while accommodating the display of virtual objects of modern graphic design which are likely to omit any indication of what may be an extensive collection of data and does not require listing of data in tables from which assimilation by a user is far less than optimal. Moreover, the facility and functionality of the invention is well adapted to be easily and quickly controlled by a user and can be completely traversed in a single drag (e.g. from home position to, ghost template property entry to an instance list entry) and drop (e.g. on selected instance) operation of any type of cursor control although continuity of the dragging operation is not required. Further, the lists of the ghost template and the instances of a property are far more easily and quickly assimilated by a user than perusal of and selection from a table since only data associated with a small number of hierarchical selections are presented and the number of hierarchical selections that are provided is not limited in any way. For example, states 333 and 334 of FIG. 3C could be replicated to allow, for example, selection among a plurality of databases or additional replications of state 335 to permit access to object data by sub-groups or categories to any desired level of granularity.

While the invention has been described in terms of a single preferred embodiment, those skilled in the art will recognize that the invention can be practiced with modification within the spirit and scope of the appended claims.

What is claimed is:

1. A method comprising:
   displaying a first virtual object image representing a first object of a plurality of objects stored in a database, the displayed first virtual object image including a first plurality of property instances of a plurality of property instances stored in the database, each property instance of the first plurality of property instances corresponding to a respective one of a plurality of property data types stored in the database;
   displaying an icon within a boundary of the first virtual object image;
   detecting user selection and movement of the icon outside the boundary of the first virtual object image;
   in response to detecting the movement of the icon outside the boundary of the first virtual object image, fetching a list of the plurality of property data types corresponding to the first plurality of property instances included in the first virtual object from the database and displaying a ghost template, the ghost template including the fetched list of the plurality of property data types corresponding to the first plurality of property instances included in the first virtual object;
   detecting selection of a first property data type of the plurality of property data types displayed in the ghost template by detecting movement of the icon to a location that coincides with the first property data type displayed in the ghost template;
   in response to detecting the selection of the first property data type of the plurality of property data types displayed in the ghost template, fetching a plurality of instances of the first property data type stored in the database and displaying a list of the fetched plurality of instances of the first property data type, each of the plurality of instances of the first property data type corresponding to a respective data record in the database;
   detecting selection of an instance from the list of the plurality of instances of the first property data type by detecting movement of the icon to a location coinciding with the selected instance of the first property data type;
   in response to detecting the selection of the instance from the list of the plurality of instances of the first property data type, fetching a second plurality of property instances from the respective data record corresponding to the selected instance of the first property data type, and displaying a second virtual object representing a second object of the plurality of objects stored in the database that is different from the first virtual object by replacing the first plurality of property instances of the first virtual object with the second plurality of property instances fetched from the respective data record corresponding to the selected instance of the first property data type.

2. The method of claim 1, further comprising detecting movement of the icon from the location coinciding with the selected instance of the first property data type to a second location indicating where to display the second virtual object image.

3. The method of claim 2, further comprising displaying an animation
   representing movement of the selected instance of the first property data type along a path to the second location.

4. A system comprising:
   a database;
   a display device; and
   a processor communicatively coupled to the display device, wherein the processor is configured to: output instructions to the display device to display a first virtual object image representing a first object of a plurality of objects stored in the database, the displayed first virtual object image including a first plurality of property instances of a plurality of property instances stored in the database, each property instance of the first plurality of property instances corresponding to a respective one of a plurality of property data types stored in the database;
   output instructions to the display device to display an icon within a boundary of the first virtual object image;
   detect user selection and movement of the icon outside the boundary of the first virtual object image;
   in response to detecting the movement of the icon outside the boundary of the first virtual object image, fetch a list of the plurality of property data types corresponding to the first plurality of property instances included in the first virtual object from the database and output instructions to the display device to display a ghost template, the ghost template including the fetched list of the plurality of property data types corresponding to the first plurality of property instances included in the first virtual object;
   detect selection of a first property data type of the plurality of property data types displayed in the ghost template by detecting movement of the icon to a location that coincides with the first property data type displayed in the ghost template;

in response to detecting the selection of the first property data type of the plurality of property data types displayed in the ghost template, fetch a plurality of instances of the first property data type stored in the database and output instructions to the display device to display a list of the fetched plurality of instances of the first property data type, each of the plurality of instances of the first property data type corresponding to a respective data record in the database;

detect selection of an instance from the list of the plurality of instances of the first property data type by detecting movement of the icon to a location coinciding with the selected instance of the first property data type;

in response to detecting the selection of the instance from the list of the plurality of instances of the first property data type, fetch a second plurality of property instances from the respective data record corresponding to the selected instance of the first property data type, and output instructions to the display device to display a second virtual object representing a second object of the plurality of objects stored in the database that is different from the first virtual object by replacing the first plurality of property instances of the first virtual object with the second plurality of property instances fetched from the respective data record corresponding to the selected instance of the first property data type.

5. The system of claim 4, wherein the processor is further configured to detect movement of the icon from the location coinciding with the second instance of the first property data type to a second location indicating where to display the second virtual object image.

6. The system of claim 5, wherein the processor is further configured to output instructions to the display device to display an animation representing movement of the selected instance of the first property data type along a path to the second location.

7. A computer program product comprising a non-transitory computer readable storage medium having program instructions embodied thereon, the program instructions executable by a computer to cause the computer to:

display a first virtual object image representing a first object of a plurality of objects stored in a database, the displayed first virtual object image including a first plurality of property instances of a plurality of property instances stored in the database, each property instance of the first plurality of property instances corresponding to a respective one of a plurality of property data types stored in the database;

display an icon within a boundary of the first virtual object image;

detect user selection and movement of the icon outside the boundary of the first virtual object image;

in response to detecting the movement of the icon outside the boundary of the first virtual object image, fetch a list of the plurality of property data types corresponding to the first plurality of property instances included in the first virtual object from the database and display a ghost template, the ghost template including the fetched list of the plurality of property data types corresponding to the first plurality of property instances included in the first virtual object;

detect selection of a first property data type of the plurality of property data types displayed in the ghost template by detecting movement of the icon to a location that coincides with the first property data type displayed in the ghost template;

in response to detecting the selection of the first property data type of the plurality of property data types displayed in the ghost template, fetch a plurality of instances of the first property data type stored in the database and display a list of the fetched plurality of instances of the first property data type, each of the plurality of instances of the first property data type corresponding to a respective data record in the database;

detect selection of an instance from the list of the plurality of instances of the first property data type by detecting movement of the icon to a location coinciding with the selected instance of the first property data type;

in response to detecting the selection of the instance from the list of the plurality of instances of the first property data type, fetching a second plurality of property instances from the respective data record corresponding to the selected instance of the first property data type, and displaying a second virtual object representing a second object of the plurality of objects stored in the database that is different from the first virtual object by replacing the first plurality of property instances of the first virtual object with the second plurality of property instances fetched from the respective data record corresponding to the selected instance of the first property data type.

8. The computer program product of claim 7, wherein the program instructions are further configured to cause the computer to detect movement of the icon from the location coinciding with the selected instance of the first property data type to a second location indicating where to display the second virtual object image.

9. The computer program product of claim 8, wherein the program instructions are further configured to cause the computer to display an animation representing movement of the selected instance of the first property data type along a path to the second location.

* * * * *